(12) United States Patent
Schulz et al.

(10) Patent No.: US 9,168,477 B2
(45) Date of Patent: Oct. 27, 2015

(54) SUPPORT TUBE FOR A FILTER ELEMENT

(71) Applicant: MANN+HUMMEL GMBH, Ludwigsburg (DE)

(72) Inventors: Franziska Schulz, Schifferstadt (DE); Bernd Burkhart, Landau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 14/085,962

(22) Filed: Nov. 21, 2013

(65) Prior Publication Data

US 2015/0027092 A1  Jan. 29, 2015

(30) Foreign Application Priority Data

Nov. 23, 2012 (DE) .......................... 10 2012 022 848

(51) Int. Cl.
| | |
|---|---|
| *B01D 46/00* | (2006.01) |
| *B01D 46/24* | (2006.01) |
| *B01D 29/19* | (2006.01) |

(52) U.S. Cl.
CPC ............ *B01D 46/2411* (2013.01); *B01D 29/19* (2013.01); *B01D 46/0005* (2013.01); *B01D 46/2403* (2013.01); *B01D 2201/0415* (2013.01); *B01D 2265/06* (2013.01)

(58) Field of Classification Search
CPC ........... B01D 46/2411; B01D 2265/06; B01D 2201/0415; B01D 46/0005; B01D 46/2403
USPC ........................................................... 55/498
See application file for complete search history.

(56) References Cited

U.S. PATENT DOCUMENTS

| | | | |
|---|---|---|---|
| 7,005,062 B1 * | 2/2006 | Bailey et al. ............. | 210/167.12 |
| 2004/0031748 A1 * | 2/2004 | Kochert et al. ............... | 210/488 |
| 2004/0134171 A1 * | 7/2004 | Scott et al. ....................... | 55/482 |
| 2006/0231483 A1 * | 10/2006 | Malgorn et al. ............. | 210/483 |
| 2007/0000830 A1 * | 1/2007 | Snider et al. .................... | 210/232 |
| 2007/0113526 A1 * | 5/2007 | Gierer ............................. | 55/467 |
| 2010/0000414 A1 | 1/2010 | Williams et al. | |
| 2010/0146917 A1 * | 6/2010 | Coulonvaux et al. ........... | 55/344 |
| 2010/0263339 A1 * | 10/2010 | Steins et al. ..................... | 55/337 |
| 2011/0247582 A1 * | 10/2011 | Blossey et al. ............ | 123/198 E |
| 2011/0308212 A1 * | 12/2011 | Ruhland et al. ................. | 55/498 |
| 2012/0324849 A1 * | 12/2012 | Ackermann et al. ............ | 55/492 |

* cited by examiner

*Primary Examiner* — Robert Clemente
(74) *Attorney, Agent, or Firm* — James Hasselbeck

(57) ABSTRACT

A filter element has a support grid structure with a first axial end and a second axial end. A filter medium surrounds annularly the support grid. The support grid has structural web members that are connected and form a hollow-cylindrical grid structure that surrounds a cylindrical interior. At least three of the structural web members or structural web sections connect to each other to define a through opening. A fluid flow is enabled in radial direction relative to a center axis of the hollow-cylindrical grid structure through the through openings. A first average opening cross-section of the through openings in a first region adjacent to a first axial end is greater than a second average opening cross-section of the through openings in a second region adjacent to the second axial end.

15 Claims, 2 Drawing Sheets

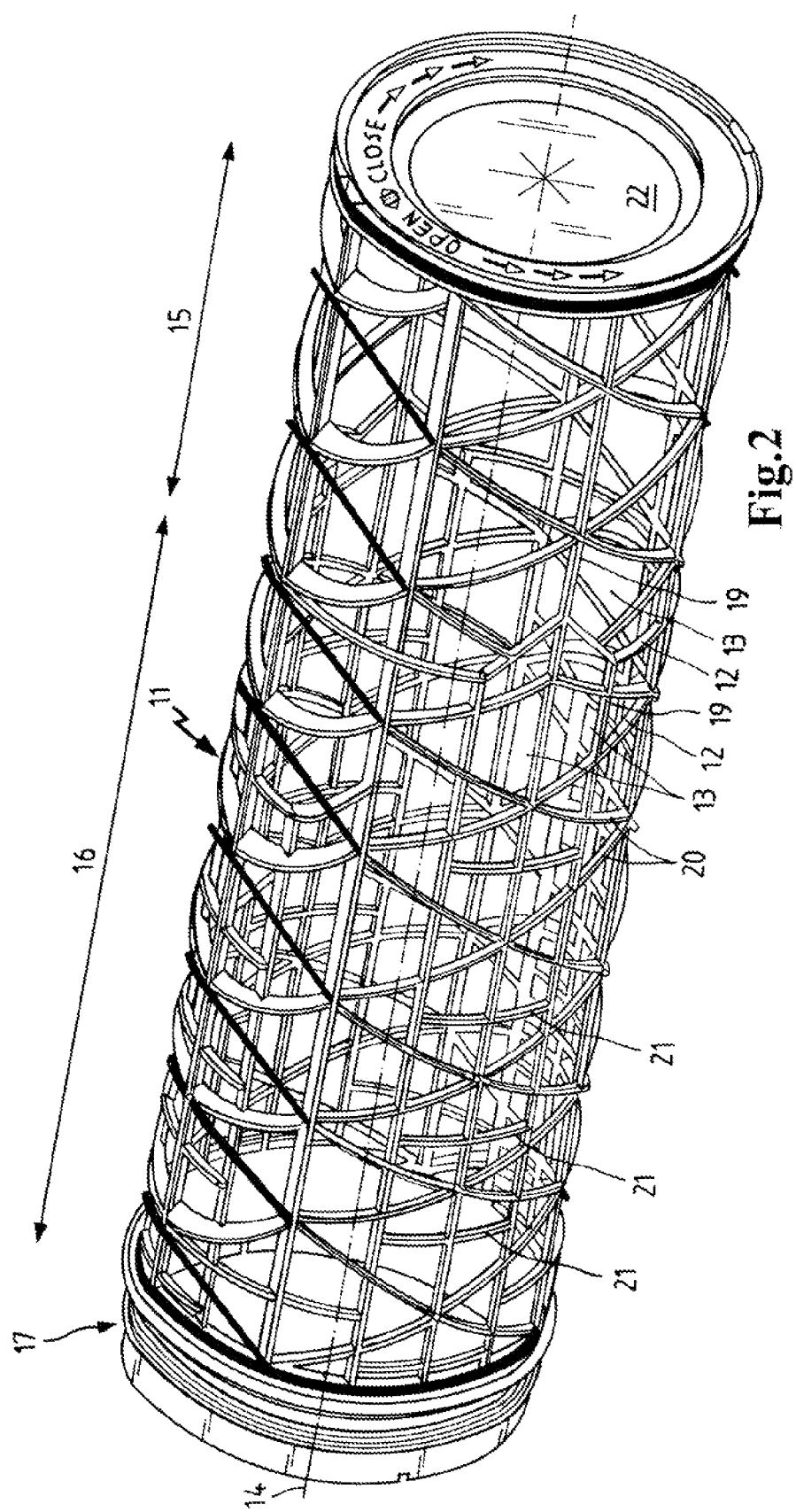

SUPPORT TUBE FOR A FILTER ELEMENT

CROSS-REFERENCE TO RELATED APPLICATION

This application claims a priority date of Nov. 23, 2012, based on prior filed German patent application No. 10 2012 022 848.1, the entire contents of the aforesaid German patent application being incorporated herein by reference.

BACKGROUND OF THE INVENTION

The invention concerns a support tube for a filter element wherein the support tube encloses an interior and a filter medium surrounds annularly the support tube. The support tube comprises a plurality of, in particular straight, webs that are partially connected with each other and form a hollow-cylindrical grid structure that surrounds a cylindrical interior. Through openings are formed by at least three webs or web sections that are connected to each other, wherein fluid can flow radially relative to the center axis of the hollow-cylindrical grid structure through the through openings.

DE 10 2010 010 964 A1 discloses a support grid for a filter element. The support grid has at one end a thread for mounting it on a filter housing. When it is screwed onto the filter housing, the support grid transmits torsion forces from the end where the operator is grips it for turning it to the other end which has the thread.

Because of the partially high loads occurring upon mounting and demounting, the webs of the support grid must have a sufficiently large cross-section for force transmission so that the cross-section of the through openings between the webs that is available for flow is reduced and the pressure loss of the filter element is increased.

The object of the invention is to provide a support tube which is resistant to torsion loads and bending loads and enables a minimal pressure loss.

SUMMARY OF THE INVENTION

In accordance with the present invention, this is achieved by a support tube in which the structural webs are connected to each other such that the through openings defined between the structural webs are larger in a first region adjacent to a first axial end of the support grid than in a second region adjacent to a second axial end of the support grid.

In this way, a region that is subjected to higher loads during use can be optimized in relation to the strength without causing a disproportionate pressure loss or disproportionate increase in material.

The aforementioned first and second regions can directly adjoin each other or can be connected by further regions that, for example, have through openings with a cross-section, especially an average cross-section, that is smaller than that of the through openings in the first region adjacent to the first axial end of the support grid and greater than that of the through openings in the second region that is adjacent to the second axial end of the support grid. In this way, a progressive course of the size of the through openings can be achieved that provides an optimum with respect to strength and available flow cross-section.

In one embodiment, the invention concerns a support grid structure in particular for use in an interior that is enclosed by a filter element wherein the support grid structure may provide radial support to the filter medium as fluid flows through the filter medium, for example, from the exterior to the interior. The support grid structure comprises preferably a plurality of structural webs/structural web members which are directly connected to other structural web members to form a grid structure that is substantially hollow-cylindrical and surrounds an open cylindrical interior. In this context, at least three structural web members directly connect to each other form through openings through which fluid can flow radially relative to the center axis of the hollow-cylindrical grid structure. Preferably, the average opening cross-section of the through openings in the first region adjacent to the first axial end of the support grid structure is greater than in the second region neighboring the second axial end of the support grid. It is particularly preferred that the opening cross-section of all through openings in the first region adjacent to the first axial end of the support grid structure is greater than the opening cross-section in the second region adjacent to the second axial end of the support grid structure.

The support grid structure is preferably formed of a synthetic material, in particular thermoplastic synthetic material, for example, with fiber reinforcement; it is further preferred that it is produced by injection molding.

The structural web members have preferably a flattened cross-section with two substantially parallel surfaces.

In a preferred embodiment, the support tube has at the second axial end a fastener, for example, a thread for attachment to a filter housing, in particular by form-fit (positive-fit) attachment. In this way, the region at the fastening location that is subjected to the highest loads upon mounting and demounting is reinforced by the through openings of smaller size. Further preferred, the support tube comprises at the first axial end a gripping area that can be gripped by the operator and where the operator can apply the bending and torsion forces required for mounting or demounting. These embodiments have the advantage that in the first region which extends away from the gripping area greater through openings can be provided than in the second region extending from the fastener in the direction toward the first region. Accordingly, the second region near the fastener that is exposed during mounting and demounting to particularly high loads in comparison to the first region can be embodied with reinforcement.

The support grid structure is embodied as a hollow-cylindrical support grid that surrounds a cylindrical interior. Moreover, it can also have an oval or elliptical cross-section and/or can be conically shaped so that the cross-section at one end, preferably at the second axial end, for example, in the area of the fastener, is greater than at the other end.

In a preferred embodiment, at least some of the structural web members are directly connected to each other such that they form triangles or surround triangular through openings. In this way, an optimal solution is provided with regard to stiffness and pressure loss.

In one embodiment, at least some of the structural web members are directly connected to each other such that they form diamond shapes or diamond-shaped through openings with at least one corner that is not a right-angle corner.

In a further preferred embodiment, some of the structural web members extend substantially parallel to the center axis across a plurality of adjoining through openings. This enables excellent absorption of bending loads at the support grid.

In a preferred embodiment, some of the structural web members extend at a slant angle, for example, along one or several reference planes, respectively, wherein the planes are not parallel and not perpendicular to the center axis. The structural web members are not spiral-shaped but, by stringing together a plurality of such connected structural web members, a continuous or discontinuous spiral-shaped ascending structure can be formed which can absorb torsional loads. Alternatively, a uniform spiral-shaped circumferentially extending structural web member shape can be selected or combined with other structural web member shapes. Preferably, several spiral-shaped ascending structures comprised of a plurality of flat structural web members are used which, in a further preferred embodiment, are partially slanted relative to each other such that they intersect each other, particularly at an acute angle. In this way, in combination with structural web members extending parallel to the center axis, triangular structures and triangular through openings can be generated. It is further preferred that several oppositely oriented spiral-shaped ascending structures can be used that preferably intersect several times. In this way, torsion loads can be absorbed well in both directions.

In one embodiment, at least two structural web members are provided in non-parallel reference planes that intersect each other in the area of the support tube and intersect with structural webs that are parallel to the center axis; in this way, the structural web members that intersect each other enclose a triangle.

In one embodiment, triangular through openings provided in the second region that is adjacent to the second axial end of the support grid structure are reinforced with one or several auxiliary webs positioned within the triangular through openings. In this way, an optimum with regard to strength, material use, and pressure loss is achieved.

In one embodiment, the auxiliary web members extend substantially parallel to the center axis or in a plane perpendicular to the center axis. In this way, the substantially triangular structures can be optimally reinforced.

In one embodiment, the auxiliary web members each are arranged either substantially parallel to the center axis or extend in a ring shape circumferentially in a plane perpendicular to the center axis so that substantially rectangular through openings are formed.

The invention concerns moreover a filter element comprising a support grid structure as described above and a filter medium surrounding annularly the support grid. The filter element, for example, is embodied as a star-shaped folded filter bellows or as a filter medium that encloses the support tube and rests flat thereon.

In one embodiment, the filter element is embodied as a main filter element with a star-shaped folded filter bellows wherein the support tube and the filter bellows are preferably connected to each other by means of one or two end disks made of castable polyurethane in a seal-tight manner such that support tube and filter bellows are embedded in the end disks.

In one embodiment, the filter element is embodied as a secondary element comprising a filter medium that encloses the support tube and rests flat thereon, for example, in the form of a nonwoven. The nonwoven can be connected seal-tightly by fusing, by adhesive connection, or by means of clamping rings with the support tube.

In the following the invention will be explained in further detail with the aid of the description of the embodiments and with the aid of the drawings, wherein the features disclosed herein or illustrated herein, in combination with the aforementioned features or individually, are subject matter of the invention and may be used to embody further variants of the inventive principle.

BRIEF DESCRIPTION OF THE DRAWINGS

FIG. 2 shows a perspective view of a support tube.

DESCRIPTION OF THE PREFERRED EMBODIMENTS

Figure 1:
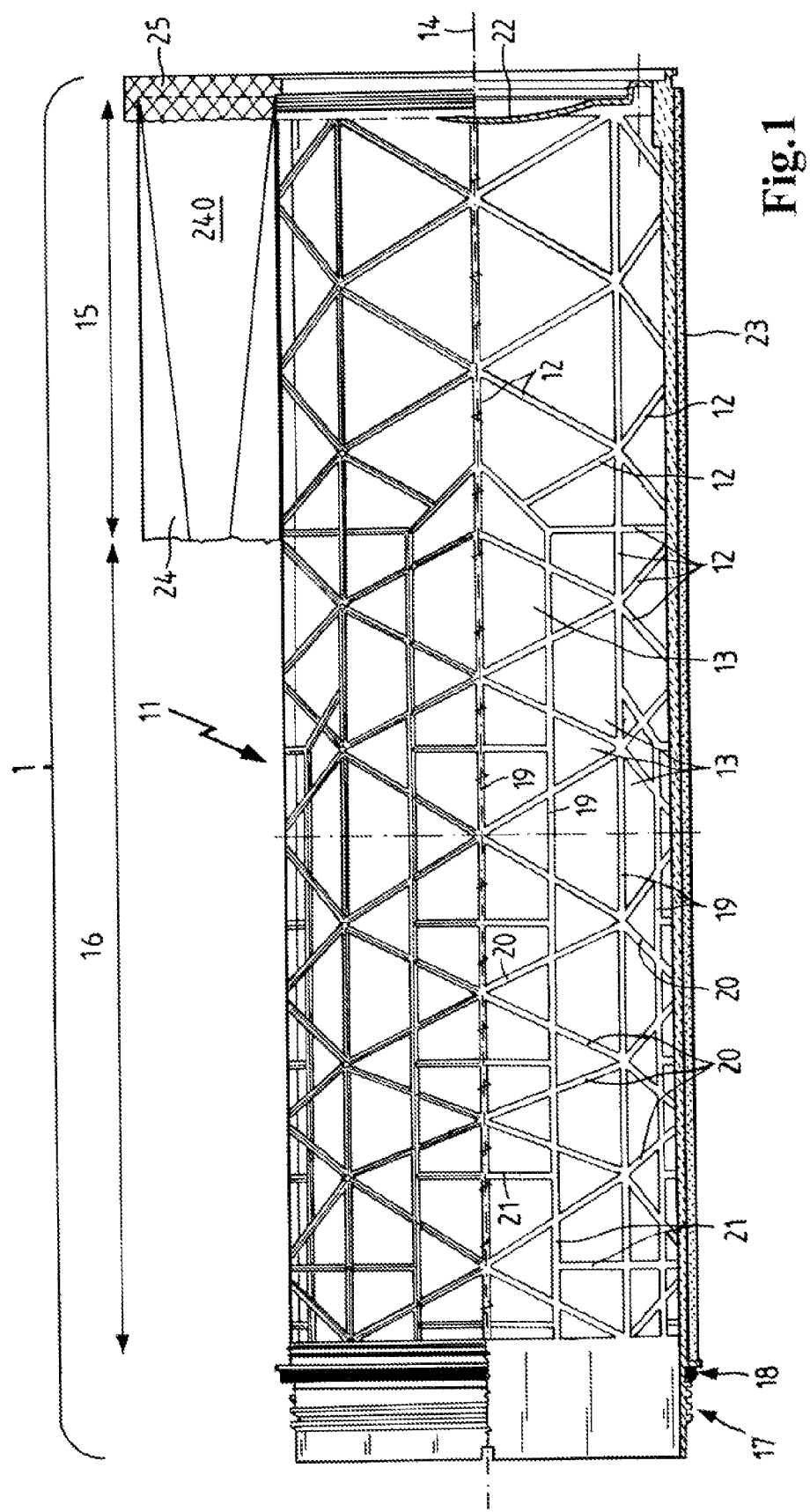
FIG. 1 shows a partial section view of a support tube wherein two possible embodiments of a filter element comprising such a support tube are shown.

FIGS. 1 and 2 show one embodiment of a support grid structure 11. The support grid structure is embodied in a hollow-cylindrical shape as a support tube and has at the first axial end preferably a closed end disk 22. At the second axial end a thread 17 for attachment on a filter housing is provided as well as an annular seal 18 for radial sealing relative to the filter housing so that the raw side which is preferably located radially outside of the support tube is separated from the clean side which is preferably formed in the interior of the support grid structure 11. The support grid structure 11 is formed of structural web members 12 that are connected to each other in such a way that they form preferably triangular through openings 13. In the first region 15 which is adjacent to the first axial end with closed end disk 22, the structural web members 12 form through openings 13 with a large cross-section. In the second region 16 which is adjacent to the second axial end and provided with the thread 17 or adjoins the thread 17, auxiliary web members 21 are provided which provide an additional reinforcement in the area of the thread 17 so that in this second region 16 through openings of a smaller size are provided.

Fluid, preferably air, can flow radially relative to the center axis of the hollow-cylindrical grid structure through the through openings 13. It is particularly preferred, as shown in the illustrated embodiment, that the opening cross-section of all through openings 13 in the first region 15 which is adjacent to the first axial end of the support grid structure 11 is greater than in the second region 16 which is adjacent to the second axial end of the support grid structure 11.

The support grid structure 11 is preferably made of a synthetic material, in particular a thermoplastic synthetic material, for example, with fiber reinforcement; it is further preferred that the support grid structure is made by injection molding.

As can be seen in FIG. 2, the structural web members have preferably a flattened cross-section with two substantially parallel surfaces. The parallel surfaces are preferably substantially parallel to the flow direction so that, while the strength is optimized, the pressure loss is minimized.

The first axial end of the support grid structure 11 forms a gripping area where the operator can grip the device and apply the necessary bending or torsion forces for mounting or demounting.

The support grid structure 11 is designed as a hollow-cylindrical grid structure which encloses a cylindrical interior. The structural web members 12 are connected to each other in such a way that they form triangles or surround triangular through openings 13.

In the second region 16, some of the structural web members 12 are connected to each other by means of auxiliary web members 21, provided only in this region 16, such that within the triangular shapes defined by the structural web members, smaller diamond-shaped through openings, preferably with at least one corner that is not a right-angle corner, are defined. The auxiliary web members 21 extends substantially parallel to the center axis 14 or in a plane perpendicular to the center axis 14. In this way, the substantially triangular structures can be optimally reinforced.

Some of the structural web members 12 and some of the auxiliary web members 21 extend substantially parallel to the center axis 14 across a plurality of adjoining through openings 13. They enable excellent absorption of bending loads acting on the support grid structure 11.

Some of the structural web members 12 extend at a slant, for example, across one or several reference planes wherein the reference planes are not parallel and not perpendicular to the center axis 14. The structural web members 12 are therefore not completely spiral-shaped or coil-shaped; however, by stringing together a plurality of such structural web members a substantially spiral-shaped ascending structure is formed which can absorb torsional loads. The support grid structure 11 is comprised of a plurality of such spiral-shaped ascending structures 20 of flat structural web members that are slanted relative to each other such that they intersect each other at an angle that is in particular an acute angle. In this way, in combination with structural web members 19 that extend parallel to the center axis, triangular structures and triangular through openings can be generated. Several oppositely oriented spiral-shaped ascending structures are used that are preferably intersecting each other several times. In this way, torsion loads can be absorbed well in both turning directions.

The invention concerns moreover a filter element 1 indicated in FIG. 1 comprising a support grid structure 11 as disclosed above and a filter medium 23 or 24 surrounding the support grid structure 11 in an annular shape. FIG. 1 show two possible embodiments of the filter element 1.

In the upper area of FIG. 1, a variant with a star-shaped folded annularly closed filter bellows 240 of filter medium 24 is indicated. The filter medium 24, for example, is made from cellulose, fiber nonwoven, or a combination of layers of different media. As indicated in the region of the closed end disk 22 of the support tube, the connection of filter bellows 240 and support grid structure 11 can be realized by means of a potting compound, for example, polyurethane, that forms a filter end disk 25 and seal-tightly connects the support grid structure 11 and the filter bellows 240 to each other. At the other end, the connection and axial sealing action can be realized in the same way or in a different way known to a person of skill in the art.

The variant which is shown in the lower area of FIG. 1 shows a possible embodiment of a filter element 1 configured in particular as a secondary filter element which comprises of flat filter medium layer 23 which is resting externally, viewed in radial direction on the support grid structure 11 and covers its through openings completely. The filter medium layer 23 can be made, for example, of cellulose, fiber nonwoven, or a combination of layers of different media. It is seal-tightly connected at both axial ends with the support grid structure 11, for example, by means of annularly extending weld seams, adhesive beads, or annular clamps.

While specific embodiments of the invention have been shown and described in detail to illustrate the inventive principles, it will be understood that the invention may be embodied otherwise without departing from such principles.

What is claimed is:

1. A filter element comprising:
a support grid structure having center axis, the support grid structure radially circumferentially surrounding and defining an open cylindrical interior, the support grid structure having a first axial end and an opposing second axial end on said center axis;
a filter medium arranged on the support grid structure, the filter medium radially surrounding and circumferentially closing around the support grid structure;
the support grid structure comprising elongated structural web members that are directly connected with other ones of the elongated structural web members and form a hollow-cylindrical grid structure that surrounds the cylindrical interior;
wherein the structural webs are arranged such that at least three of the structural web members or structural web sections of the structural web members that are directly connected to each other define a through opening, respectively, wherein a fluid flow is enabled in a radial direction relative to the center axis of the hollow-cylindrical grid structure through the through openings;
wherein a first average opening cross-section of the through openings in a first region adjacent to a first axial end is greater than a second average opening cross-section of the through openings in a second region adjacent to the second axial end;
wherein some of the structural web members are slanted structural webs slanted relative to the center axis;
wherein slanted structural webs are not aligned parallel to and not aligned perpendicular to the center axis;
wherein said slanted structural web members are positioned in the first region at a first slant angle slanted relative to a normal plane to the center axis and are positioned in the second region at a second slant angle relative to said normal plane;
wherein the first slant angle is greater in magnitude than the second slant angle;
wherein the first slant angle changes stepwise into the second slant angle in an axial direction of the support grid structure.

2. The filter element according to claim 1, wherein the structural web members are straight structural web members.

3. The filter element according to claim 1, further comprising
a fastener secured on the second axial end that is adapted to form-fittingly connect the filter element to a filter housing.

4. The filter element according to claim 3, wherein the fastener is a threaded for forming a threaded connection to the filter housing.

5. The filter element according to claim 1, wherein at least some of the structural web members are directly connected to each other such that triangles or triangular through openings are defined by the structural web members.

6. The filter element according to claim 1, wherein at least some of the structural web members are directly connected to each other such that diamond shapes or diamond-shaped through openings are defined by the structural webs,
wherein the diamond shapes or the diamond-shaped through openings have at least one corner that is not a right-angle corner.

7. The filter element according to claim 1, wherein some of the structural web members are substantially parallel to the center axis across a plurality of adjoining through openings.

8. The filter element according to claim 1, wherein said slanted structural web members extend across one or several reference planes,
wherein the reference planes are not parallel and not perpendicular to the center axis.

9. The filter element according to claim 1, wherein the first slant angle changes into the second slant angle in three or more steps.

10. The filter element according to claim 1, wherein
several of the slanted structural web members form a spiral construction of structural web members surrounding the cylindrical interior,
wherein a pitch of the spiral construction decreases continuously or discontinuously from the first axial end to the second axial end.

11. The filter element according to claim 10, wherein
at least two of said spiral constructions are provided that have opposite orientation and intersect at least at one location.

12. The filter element according to claim 10, wherein
several of the structural web members are parallel structural web members that extend parallel to the center axis,
wherein several of said spiral construction are provided that have opposite orientation and intersect each other,
wherein said spiral constructions intersect the parallel structural web members in such a way that the through openings are triangular openings whose average opening cross-section decreases continuously or discontinuously from the first axial end to the second axial end.

13. The filter element according to claim 1, wherein
several of the structural web members are parallel structural web members that extend parallel to the center axis and wherein at least two of the structural web members extend in non-parallel reference planes,
wherein said at least two structural web members extending in the non-parallel reference planes intersect each other and intersect the parallel structural web members such that the through openings are triangular openings.

14. A filter element, comprising:
a support grid structure having center axis, the support grid structure radially circumferentially surrounding and defining an open cylindrical interior, the support grid structure having a first axial end and an opposing second axial end on said center axis;
a filter medium arranged on the support grid structure, the filter medium radially surrounding and circumferentially closing around the support grid structure;
the support grid structure comprising elongated structural web members that are directly connected with other ones of the elongated structural web members and form a hollow-cylindrical grid structure that surrounds the cylindrical interior;
wherein the structural webs are arranged such that at least three of the structural web members or structural web sections of the structural web members that are directly connected to each other define a through opening, respectively, wherein a fluid flow is enabled in a radial direction relative to the center axis of the hollow-cylindrical grid structure through the through openings;
wherein a first average opening cross-section of the through openings in a first region adjacent to a first axial end is greater than a second average opening cross-section of the through openings in a second region adjacent to the second axial end;
wherein the support grid structure comprises auxiliary web members,
wherein in the second region the through openings defined by the structural web members are triangular openings and
wherein the auxiliary web members are arranged within the triangular openings and directly connected to the structural webs to reinforce the triangular openings.

15. The filter element according to claim 14, wherein
the auxiliary web members are substantially parallel to the center axis or extend in a plane that is perpendicular to the center axis.

* * * * *